United States Patent
Tuma

(10) Patent No.: US 8,049,414 B2
(45) Date of Patent: Nov. 1, 2011

(54) DISPLAY DEVICE

(75) Inventor: Jan Tuma, Herrenberg (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 1296 days.

(21) Appl. No.: 10/579,064

(22) PCT Filed: Mar. 23, 2005

(86) PCT No.: PCT/EP2005/003106
§ 371 (c)(1),
(2), (4) Date: May 11, 2006

(87) PCT Pub. No.: WO2005/093693
PCT Pub. Date: Oct. 6, 2005

(65) Prior Publication Data
US 2007/0138955 A1    Jun. 21, 2007

(30) Foreign Application Priority Data

Mar. 29, 2004    (DE) .................... 10 2004 016 627

(51) Int. Cl.
*H01L 51/50*    (2006.01)
(52) U.S. Cl. ........................................ 313/506
(58) Field of Classification Search ............. 313/506, 313/512
See application file for complete search history.

(56) References Cited

U.S. PATENT DOCUMENTS

| | | | |
|---|---|---|---|
| 4,429,348 A * | 1/1984 | Dean | 361/757 |
| 4,602,191 A | 7/1986 | Davila | |
| 5,136,470 A * | 8/1992 | Sheridon et al. | 361/749 |
| 5,287,215 A | 2/1994 | Warde et al. | |
| 5,457,610 A * | 10/1995 | Bernardoni et al. | 361/816 |
| 5,774,341 A * | 6/1998 | Urbish et al. | 361/774 |
| 5,818,998 A | 10/1998 | Harris et al. | |
| 6,173,899 B1 * | 1/2001 | Rozin | 235/492 |
| 6,317,108 B1 | 11/2001 | Kalt | |
| 6,402,336 B1 | 6/2002 | Reese | |
| 6,598,274 B1 * | 7/2003 | Marmaropoulos | 24/451 |
| 2002/0099157 A1 * | 7/2002 | Stephan et al. | 526/260 |
| 2002/0113925 A1 * | 8/2002 | Higashi | 349/113 |
| 2002/0144442 A1 * | 10/2002 | Harasawa et al. | 40/586 |
| 2006/0131066 A1 * | 6/2006 | Tuma | 174/259 |

FOREIGN PATENT DOCUMENTS

| | | |
|---|---|---|
| DE | 101 06 705 | 4/2002 |
| DE | 10301424 B3 * | 2/2004 |

(Continued)

OTHER PUBLICATIONS

English translation of DE 103 01 424 B3 to Tuma.*

*Primary Examiner* — Toan Ton
*Assistant Examiner* — Hana Featherly
(74) *Attorney, Agent, or Firm* — Roylance, Abrams, Berdo & Goodman, L.L.P.

(57) ABSTRACT

A display device (1; 101) includes a plurality of picture elements (2; 102) for displaying still and moving images, alphanumeric characters or the like. The picture elements can be controlled, either individually or in groups, by an electronic control system. The display device (1; 101) has a first flat substrate (3; 103) with fastening elements (5; 105) which project at least in sections, from its first surface (4; 104) to detachably fix the display device (1; 101) to a carrier device (7), by the co-operation of the fastening elements (5; 105) of the first flat substrate (3; 103) with the carrier device (7).

11 Claims, 3 Drawing Sheets

FOREIGN PATENT DOCUMENTS

| | | |
|---|---|---|
| DE | 202 15 401 | 3/2004 |
| EP | 1 248 141 | 10/2002 |
| JP | 2003-051383 | 2/2003 |
| JP | 2003-115388 | 4/2003 |
| WO | WO 02/35672 | 5/2002 |
| WO | WO 02/071382 | 9/2002 |

* cited by examiner

DISPLAY DEVICE

FIELD OF THE INVENTION

The present invention relates to a display device with a plurality of pixels for display of static and motion pictures, alphanumeric characters or the like. The pixels are triggerable by trigger electronics individually or in groups. The display device has a first flat substrate.

BACKGROUND OF THE INVENTION

These display devices are common for example in the area of entertainment electronics or information technology. The technology most frequently used at present is based on liquid crystals which can be used in a triggerable manner as light valves and for example are used as LCDs (liquid crystal displays) in computer monitors, TV and video display equipment, information boards and the like. Alternative technologies for implementing the pixels are for example plasma technology or the use of light emitting diode arrays of inorganic semiconductors.

The known display devices are installed in a housing also used to protect the display device. If the housing is made as a desktop housing, it has the corresponding mechanical stability. In the case of wall mounting, as is of interest for example in entertainment electronics, complex mounting devices are necessary.

U.S. Pat. No. 4,602,191 discloses an article of clothing with openings in its cover fabric, through which light emitting diodes can be inserted from the back. The light emitting diodes are connected to a flexible circuit board. On the side on which the light emitting diodes project away from the circuit board, on the circuit board an adhesion closure part is fastened. The adhesive closure part has a plurality of adhesion closure elements. The adhesion closure elements protrude from the adhesion closure part in the direction of the light emitting diodes and are intended for engagement with hook-shaped adhesion closure elements of a second adhesion closure part located on the inside of the article of clothing.

DE 202 15 401 U1 shows a combination of a thin substrate and a carrier substrate by cementing, by adhesion forces, by electrostatic forces or by a vacuum.

WO 02/35672 A2 shows an electrical cable with adhesion closure elements on its surface to fix the cable with them on a carrier surface.

JP 2003-115388 A and JP 2003-051383 A show laminar structures for producing organic light emitting diodes, so called OLEDs.

SUMMARY OF THE INVENTION

An object of the present invention is to provide a display device overcoming the disadvantages of the prior art, especially simplifying attachment and increasing the functionality and possible applications of these display devices. Attachment should be simple and preferably possible without tools. The fasteners should be easy and economical to produce and ensure permanently reliable attachment.

The object is basically achieved by a display device having a first flat substrate. From the first surface of the first flat substrate at least in areas, adhesion closure elements project for detachably fixing the display device to a carrier. The attachment forces can be formed by mechanical interlocking and/or by chemical binding forces. Mechanical interlocking can be achieved for example with adhesion closure elements produced by a shaping process with integral execution of the adhesion closure elements together with a flat support, as described for example in DE 196 46 318 A1. The adhesion closure elements can be hook-shaped, mushroom-shaped or loop-shaped, or can have other corresponding interlocking means. The adhesion closure elements of the first flat substrate can be formed for example from hooks, mushrooms, loops, piles or the like, and can interact with the corresponding adhesion closure elements of the carrier. The adhesion closure elements of the flat substrate and of the carrier can be made identical or complementary, for example, with hook-hook, mushroom-mushroom, hook-loop or mushroom-loop connections being possible.

Alternatively or in addition, the adhesion closure elements of the first flat substrate can interact with a surface of the carrier by chemical bonding forces, or interact especially by means of van der Waals forces or dipole forces. To do this, for example stems made integrally with the flat substrate on their free end can be divided into a plurality of individual fibers, for example into several hundred fibers per stem. A typical diameter of that fiber is less than 2 µm, preferably less than 1 µm and typically roughly 0.2 µm. The length of the individual fibers is preferably less than half the total length of the stem, especially less than 35% and preferably roughly 20%. The end-side parts of the stems can be made in the most different ways, for example by mechanical cutting, brushing, whipping, water jet cutting, laser cutting, by rupturing as a result of brief strong energy feed, by chemical etching, or the like.

The adhesion closure elements can also be made such that the ends of the stems on the end surface pointed toward the surface of the carrier have a flat or even slightly convex arch, especially the end surface opposite the following area of the stems being flared. The throat-like flaring of the ends of the stems can define a type of predetermined kinking point enabling detachment of the adhesion closure elements from the carrier with lower forces. The end surfaces of the stems interact with the surface of the carrier by van der Waals forces. Suitable plastic materials for these adhesion closure elements are inorganic and organic elastomers, especially polyvinyl siloxane, and addition-crosslinking silicone elastomers, also in the form of binary systems as acrylates. The use of rubber materials is also possible.

The production process can be made especially favorable when the plastic material used at the time is thixotropic. Thixotropic behavior in the sense of the invention means reducing the structural thickness during the shear loading phase and its more or less rapid but complete re-establishment during the subsequent resting phase. This breakdown/build-up cycle is a completely reversible process and thixotropic behavior can be defined as a time-dependent behavior. Furthermore, plastic materials have proven especially advantageous in which a viscosity of 7000 to 15000 mPas measured with a rotary viscosimeter is sufficient, but preferably has a value of roughly 10000 mPas at a shear rate of 10 l/sec. In the sense of a self-cleaning surface it has moreover proven to be advantageous to use plastic materials with a contact angle having at least a value of greater than 60° due to their surface energy for wetting with water. Under certain circumstances this surface energy can also be further changed by subsequent coating processes.

In one special embodiment of the invention the adhesion closure elements in any case are produced partially without molding tools. The pertinent process is described in DE 100 65 819 C1 and DE 101 06 705 C1. In this connection plastic material is deposited by at least one application device in successively released drops. The deposition locations of the drops can be chosen to be three-dimensional with respect to the shape of the adhesion closure elements to be formed. In this way hook elements, mushroom elements, loop elements and the like can be produced with great latitude of shape, for example in the manner of an inkjet printing process.

Preferably the first flat substrate is produced from a plastic, especially from a thermoplastic. Alternatively the first flat substrate can also be produced from a duroplastic, especially in the case of adhesion closure elements produced without molding tools. The adhesion closure elements are preferably of the same material as the first flat substrate. Basically especially polyethylenes and polypropylenes are possible. Moreover a plastic material can be selected from the group of acrylates such as polymethacrylates, polyethylene, polypropylene, polyoxymethylene, polyvinylidene fluoride, polymethylpentene, polyethylene chlorotrifluoroethylene, polyvinyl fluoride, polyethylene oxide, polyethylene terephthalate, polybutylene terephthalate, nylon 6, nylon 66, and polybutene.

Preferably the first flat substrate is flexible. In this way flexible, foldable or rollable display devices can be implemented. In this way the display device can be fixed on carrier means of almost any shape.

Preferably the triggerable pixels and/or at least some of the trigger electronics are located on the first flat substrate. The trigger electronics can have especially one active switching device, especially a switching transistor, per pixel. Depending on the technology selected for the pixels, for example liquid crystals, electronic inks, or electroluminescent elements, in any case part of the trigger electronics and/or of the pixels can be produced by common process steps, especially by the process steps known from thick film technology or thin film technology, such as vapor-deposition, cathode sputtering, precipitation from the gaseous phase, photolithographic structuring and the like.

The triggerable pixels and/or at least part of the trigger electronics can be located on a second surface of the first flat substrate, especially opposite the first surface. The pixels and trigger electronics can be located next to one another or on top of one another. The emission direction or reflection direction can be dictated by the corresponding reflection layers or cover layers. Basically the display device can be made as a transmitted light display device, reflection display device, or self-luminous display device. For example there can be a flat illuminant in the manner of the background illumination of a LCD. The flat illuminant can be made integrally with the first flat substrate, in particular the luminous layer can be applied flat on one surface of the flat substrate.

The pixels can be produced on the second flat substrate, especially separately from the first flat substrate with its adhesion closure elements. In this case the partially or completely produced first and second substrates can be joined to one another. In particular the second flat substrate can be laminated to the first flat substrate. Alternatively, the pixels can also be applied directly to the first flat substrate, preferably after the adhesion closure elements are already located on its back. In this case the adhesion closure elements can be used to fix the substrate during the pixel production process. Depending on the technology of producing the pixels, it is also possible, in an intermediate stage or after completion of production of the pixels, to apply the adhesion closure elements to the first flat substrate, for example by shaping the surface of the first flat substrate or by producing the adhesion closure elements without molding tools, as is described above.

In one special embodiment of the invention, a flat illuminant is applied to the first flat substrate which preferably already has the adhesion closure elements, first of all in thick film or thin film technology. Separately from this, the actual display device with the pixels and optionally also the trigger electronics are applied to the second flat substrate. Electrical connections can also be produced between the trigger electronics on the second substrate and the illuminant on the first substrate.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are not drawn to scale.

DETAILED DESCRIPTION OF THE INVENTION

Figure 1:
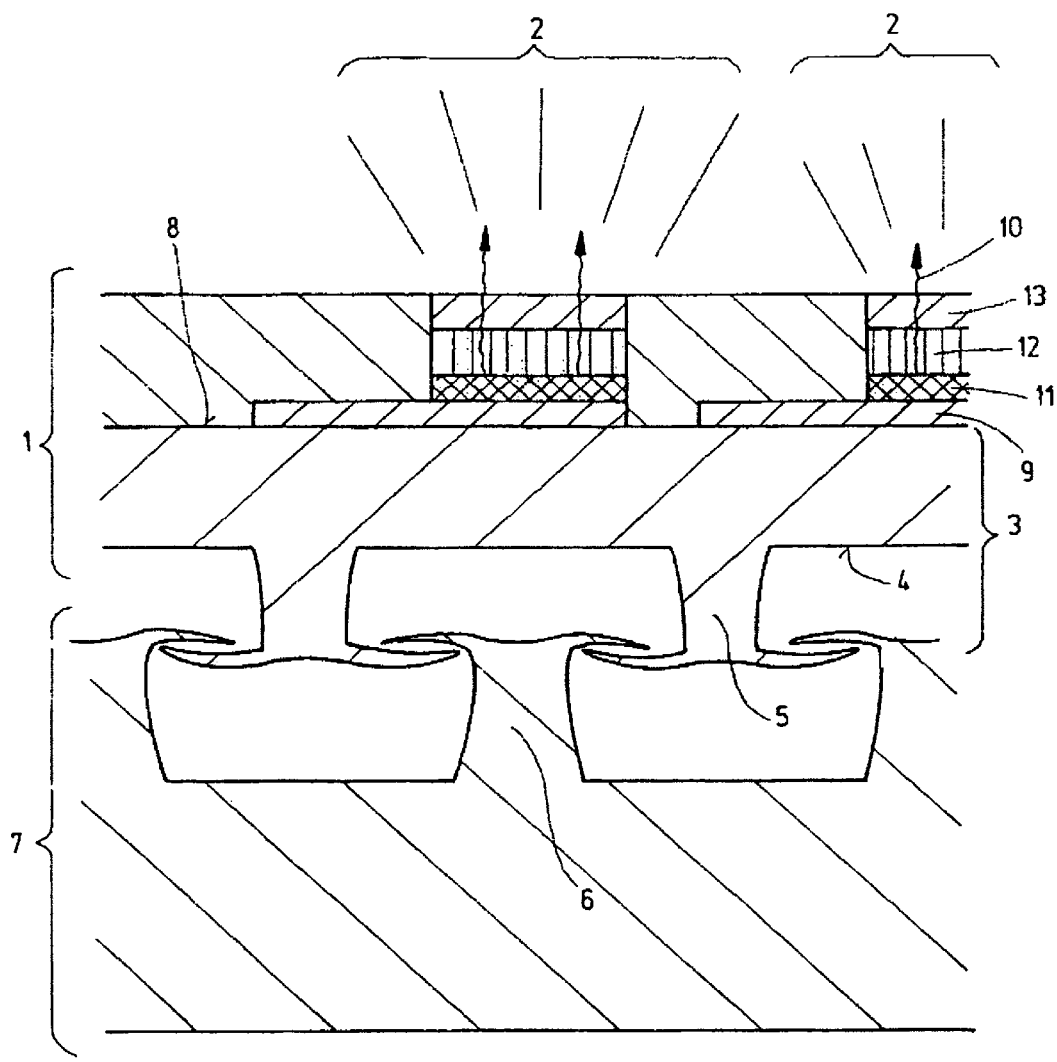
FIG. 1 is a schematic side elevational view in section of a display device according to a first exemplary embodiment of the present invention.

FIG. 1 schematically shows a cross section through a first exemplary embodiment of the display device 1 of the invention, having a plurality of pixels 2 for display of static and motion pictures, alphanumeric characters or the like. The pixels 2 can also be triggered by trigger electronics (not shown in FIG. 1) individually or in groups, especially in the conventional form by way of rows and columns. Overall for example a matrix of 640×480 pixels can be triggered. For a colored display, each pixel can be formed from three pixel elements, one pixel element each for red, green and blue. Adhesion closure elements 5 protrude from a flat surface 4 of a first flat substrate 3 at least in areas, preferably over the entire surface. These adhesion closure elements 5 can be formed integrally by the first substrate 3 and can be produced for example according to the process described in DE 196 46 318 A1.

A carrier can be a frame, the surface of a housing or an article of textile clothing can be detachably secured to the display device 1 and has adhesion closure elements 6 which interact with the adhesion closure elements 5 of the first flat substrate 3. Especially, the closure elements 5 can be interlocked. In this illustrated exemplary embodiment, the adhesion closure elements 6 of the carrier are made identically to the adhesion closure elements 5 of the first flat substrate 3. In particular, the adhesion closure elements 6 are made integrally with a support according to DE 196 46 318 A1 in the form of a second flat substrate 7. Alternatively to the illustrated exemplary embodiment, the adhesion closure elements 5, 6 of the first flat substrate 3 and/or the carrier can also be made hook-shaped, loop-shaped or pile-like. The adhesion closure elements 5 of the first flat substrate 3 can also be interlocked with the texture of an article of textile clothing, furniture upholstery, a wall covering, or the like.

On the side opposite the first surface 4 structural layers are applied to the first flat substrate 3 in thick film or thin film technology, from which layers the pixels 2 are produced. In particular, first electrical printed conductors 9 forming an electrode for the pixels 2, for example the cathode, are applied to the second surface 8. A layer 11 emitting light 10 when energy is supplied can be a polymer layer and be applied to the cathode. These light-emitting polymer layers are known for example from PHILIPS product information: "Polymer light-emitting diodes". At the top a charge carrier-transporting layer 12 is applied and covered by a transparent electrically conductive electrode 13, especially an anode.

When a voltage is applied between the first printed conductor 9 and the electrode 13, light 10 is emitted. The layers necessary for producing the pixels 2 can be produced for example by spin coating or by other processes known from thick and thin film technology with subsequent structuring, or can be already structured using screen printing processes or printing heads, as are known from inkjet technology.

The first embodiment shown in FIG. 1 is a self-luminous display device 1. The light 10 can fundamentally be emitted all around or only in certain definable directions by cover layers or reflection layers. In particular it is fundamentally also possible to emit light 10 also or exclusively via the first surface 4 of the display device 1 on which the adhesion closure elements 5 are located.

Figure 2:
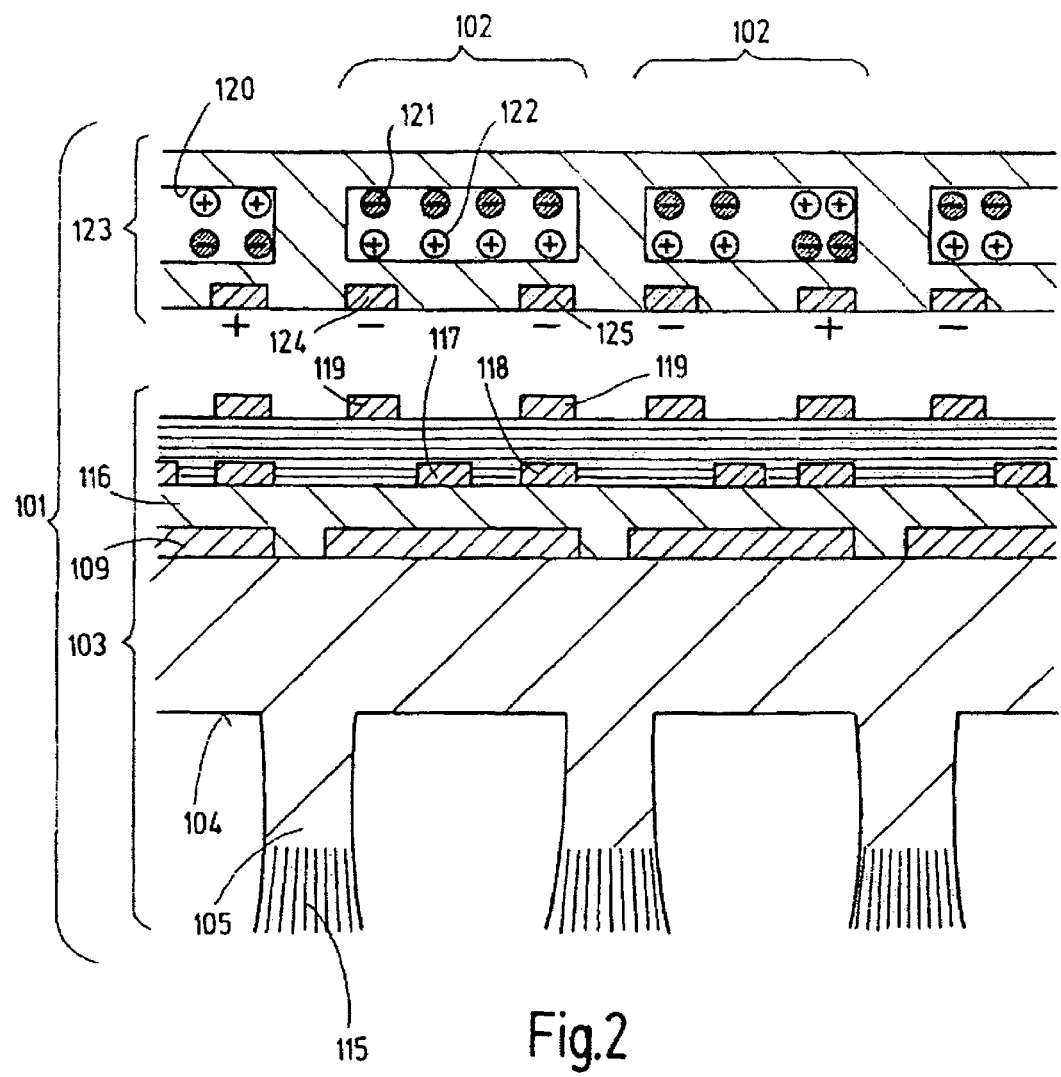
FIG. 2 is a schematic side elevational view of a display device according to a second exemplary embodiment of the present invention.

FIG. 2 shows a second embodiment of a display device 101 of the invention. The first flat substrate 103 has adhesion closure elements 105 protruding from the first surface 104 and forming a plurality of individual fibers 115 on their free ends. Based on the selected material for the adhesion closure elements 105, chemical binding forces occur on the individual fibers 115, especially dipole binding forces or van der Waals forces. The display device 110 can be attached to a carrier without any special surface structure, especially without mechanical adhesion closure elements being formed.

On the opposite surface, structures are applied to the first flat substrate 103 by which electrical switching functions can be accomplished, especially field effect transistors. The first electrical printed conductor 109 forms a control electrode, especially the gate electrode of a polymer field effect transistor. Over it an insulating layer 116 forms the gate insulation. On it are source electrodes 117 and acceptor electrodes 118, especially source and drain electrodes of the field effect transistor. The current flow between the source electrode 117 and the acceptor electrode 118 can be controlled via the potential on the first printed conductor 109. The pertinent output electrode 119 is switched to a definable potential according to the operating state.

The actual light-controlling or light-emitted layer, for example also the arrangement of the light emitting diodes shown in the first exemplary embodiment, an arrangement of liquid crystals which represent the individual pixels by a cell-like arrangement, or other display means, can now be applied to the first flat substrate 103.

In the second embodiment of FIG. 2 the pixels 102 are formed by electronic ink. To do this, in a second flat substrate 123 in microcapsules 120 black and white particles 121, 122 are enclosed which can be moved under the influence of an electrical field within the microcapsule 120. The electrical field necessary to do this is produced by terminal electrodes 124, 125 provided in pairs for each pixel 102. By applying a corresponding potential to the terminal electrodes 124, 125 a definable distribution of black and white particles 121, 122 arises within the microcapsule 120, which yield a different visual appearance when light shines through or is reflected.

In the illustrated exemplary embodiment the first flat substrate 103 and the second flat substrate 123 can be produced separately. A subsequent process the first flat substrate 103 is permanently connected to the second flat substrate 123, for example laminated, pressed, cemented, fused or the like. In this mechanical connection the required electrical connections can also be produced between the first flat substrate 103 having at least parts of the trigger electronics, and the second flat substrate 123, for example by bringing the output electrodes 119 into contact with the terminal electrodes 124, 125.

Figure 3:
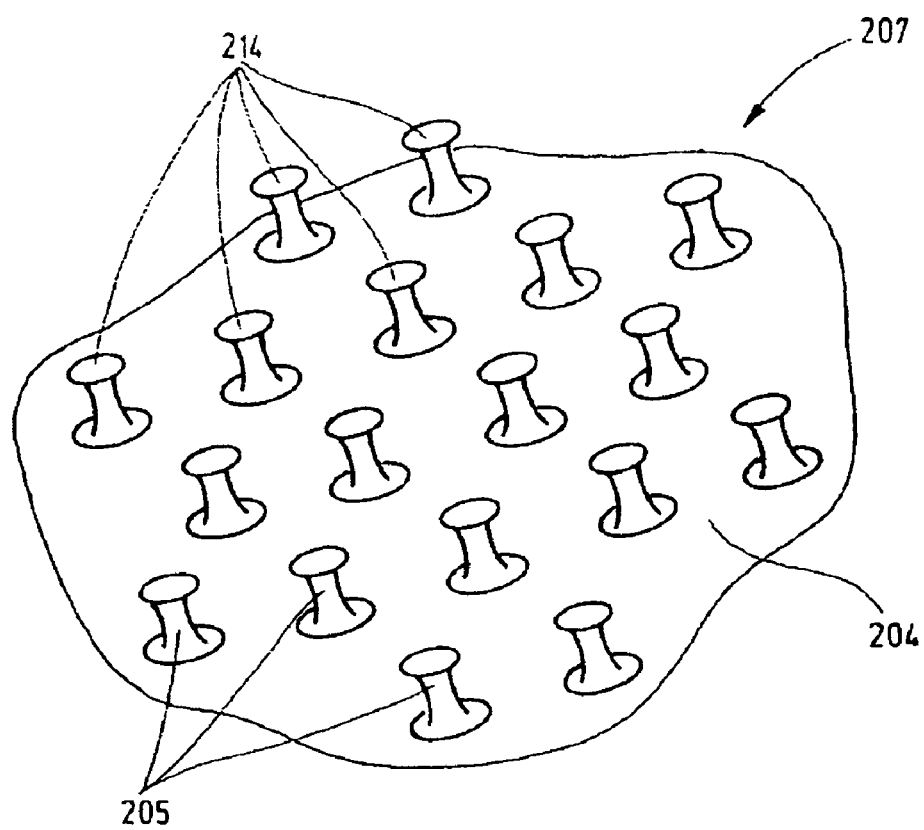
FIG. 3 is a schematic perspective view of a display device according to a third exemplary embodiment of the present invention.
Figure 4:
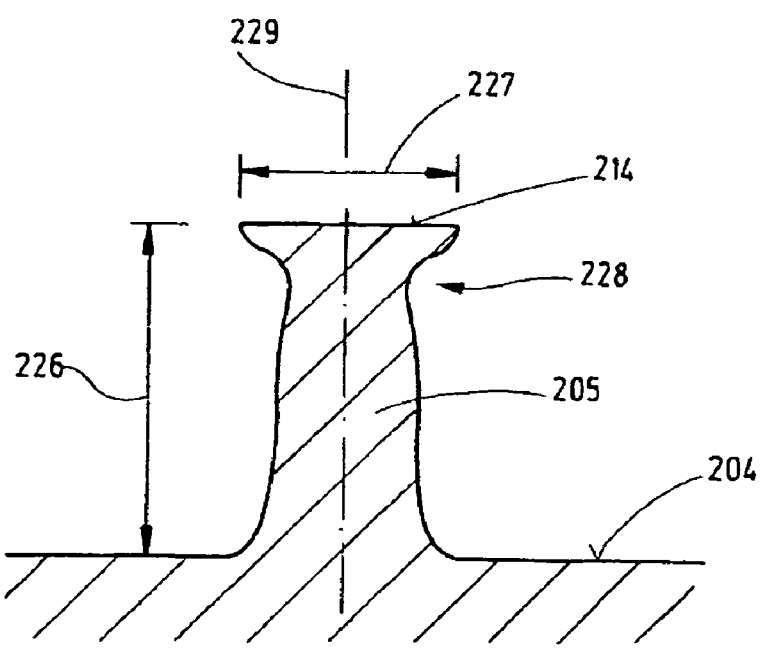
FIG. 4 is a side elevational view in section through an adhesion closure element of FIG. 3.

FIG. 3 shows another embodiment of the adhesion closure elements 205 used in the invention in a perspective view of the first surface 204 of the first flat carrier 207. FIG. 4 shows a cross section through an adhesion closure element 205.

The height 226 of the adhesion closure elements 205 from the surface 204 to the preferably plane end surface 214 is between 20 and 500 µm, especially between 50 and 200 µm, preferably roughly 100 µm. The extension 227 of the plane end surface 214 parallel to the surface 204 is between 10 and 250 µm, especially between 25 and 100 µm, preferably roughly 50 to 60 µm. Spaced between 5 and 30% of the height 226 of the end surface 214, especially between 10 and 20%, preferably roughly 15%, the adhesion closure element 205 by a cross section reduced for example by roughly 10 to 40%, especially roughly 20 to 25%, forms a type of predetermined kinking point 228 at which the head part with the end surface 214 can bend when the adhesion closure element 205 is detached. This bending can facilitate detachment from the surface of the carrier. The distances between adjacent adhesion closure elements 205 are preferably less than the extension 227 of the plane end surface 214, preferably they are between 50 and 80% of the extension 227.

The adhesion closure elements 205 are preferably symmetrical to the axis 229 of symmetry, especially rotationally symmetrical. Both the head cross sections as well as the stem cross sections can be square. Especially they can be provided with a hexagonal cross sectional shape. The aspect ratio of an adhesion closure element 205 is preferably between 1:1.5 and 1:5.

While various embodiments have been chosen to illustrate the invention, it will be understood by those skilled in the art that various changes and modifications can be made therein without departing from the scope of the invention as defined in the appended claims.

What is claimed is:

1. A display device, comprising
a first flat substrate having first and second opposite surfaces;
adhesion closure elements being unitary and one piece with said first flat substrate and extending from said first surface to detachably secure said first flat substrate to a carrier by interaction of said adhesive closure elements with the carrier;
triggerable pixels of thin-film or thick-film technology on said first flat substrate for displaying at least one of static and motion pictures and alphanumeric characters, said triggerable pixels being triggerable by trigger electronics individually or in groups; and
a flat illuminant of thin-film or thick-film technology emitting light as a result of being supplied with electrical energy on said first flat substrate and located between said first flat substrate and said triggerable pixels.

2. A display device according to claim 1 wherein said adhesion closure elements are interlockable mechanically with corresponding adhesion closure elements on the carrier.

3. A display device according to claim 1 wherein said adhesion closure elements are interactable with a carrier surface by Van der Waals forces.

4. A display device according to claim 1 wherein said adhesion closure elements are producable without molding tools.

5. A display device according to claim 1 wherein said first flat substrate is formed of thermoplastic.

6. A display device according to claim 1 wherein said first flat substrate is formed of duroplastic.

7. A display device according to claim 1 wherein said first flat substrate is elastic.

8. A display device according to claim 1 wherein said triggerable pixels are located directly on said second surface of said first flat substrate.

9. A display device according to claim 1 wherein said triggerable pixels are selected from the group consisting of liquid crystals, electronic ink and electroluminescent components.

10. A display device according to claim 1 wherein said triggerable pixels are polymer light emitting diodes.

11. A display device according to claim 1 wherein said triggerable pixels are directly on a second flat substrate laminated on said second surface of said first flat substrate.

* * * * *